United States Patent [19]

Imai et al.

[11] Patent Number: 5,578,649
[45] Date of Patent: Nov. 26, 1996

[54] PROCESS FOR PRODUCING EPOXY ADHESIVE AUXILIARY, AND EPOXY ADHESIVE

[75] Inventors: Yoshio Imai, Kyoto; He Fei-Feng; Xue Shu-Chang, both of Hadano; Takao Hidai, Anjo, all of Japan

[73] Assignee: INOAC Corporation, Japan

[21] Appl. No.: 402,564

[22] Filed: Mar. 13, 1995

Related U.S. Application Data

[63] Continuation of Ser. No. 133,981, Oct. 8, 1993, abandoned.

[30] Foreign Application Priority Data

Oct. 9, 1992 [JP] Japan .................................. 4-298098
Apr. 14, 1993 [JP] Japan .................................. 5-112096

[51] Int. Cl.$^6$ ............................. C08J 11/24; C08G 59/64
[52] U.S. Cl. .......................................... 521/49.5; 528/111
[58] Field of Search ........................... 521/49.5; 528/111

[56] References Cited

U.S. PATENT DOCUMENTS 4,014,809 3/1977 Kondo et al. ........................... 521/49.5
4,110,266 8/1978 Sheratte .................................. 521/49.5

FOREIGN PATENT DOCUMENTS 3-3689 1/1991 Japan .

OTHER PUBLICATIONS

Derwent Abstract #84-192364/31, of JP 59109512-A or J91003689-B.

English translation of Abstract of Japanese Laid-Open No. Hei 3-3689.

*Primary Examiner*—John C. Bluetge
*Assistant Examiner*—D. R. Wilson
*Attorney, Agent, or Firm*—Finnegan, Henderson, Farabow, Garrett & Dunner, L.L.P.

[57] ABSTRACT

Disclosed herein are a process for producing an epoxy adhesive auxiliary which is a liquid reclaimed from rigid polyurethane foam and an epoxy adhesive which contains the auxiliary. The epoxy adhesive auxiliary can be produced, without requiring any special apparatus for purification, by incorporating rigid polyurethane foam (200 g) in powder form (5–10 mm in size) with glycol such as polyethylene glycol (100 g) and amino alcohol such as 2-aminoethanol (5 g), and heating them at 150°–280° C., thereby chemically decomposing the rigid polyurethane foam into a viscous liquid. This reclaimed liquid (50–300 g) is incorporated as such into an epoxy resin adhesive base such as bisphenol A-type epoxy resin (100 g), containing optional diethylamine (6–8 g). The resulting epoxy resin adhesive is superior in tensile shear bond strength.

7 Claims, No Drawings

PROCESS FOR PRODUCING EPOXY ADHESIVE AUXILIARY, AND EPOXY ADHESIVE

This application is a continuation of application Ser. No. 08/133,981, filed Oct. 8, 1993, now abandoned.

BACKGROUND OF THE INVENTION

1. Field of the Invention

The present invention relates to a process for producing an epoxy resin auxiliary in the form of liquid reclaimed from rigid polyurethane foam. The present invention also relates to an epoxy adhesive produced from this reclaimed liquid.

2. Description of the Prior Art

Rigid polyurethane foam is widely used in large quantities in a variety of industrial fields (such as shipping, aircraft, vehicles, plants, heat insulators, construction and building, furniture, and interior) on account of its lightness, heat insulating properties, and good processability. The production and fabricating of the Rigid polyurethane foam to be used are performed by slabstock foaming method, pour-in-place method, spraying method, or panel-molding method etc. The production, fabrication, and use of rigid polyurethane foam are accompanied by a large amount of scrap (waste) foam. There is no effective reclaim method of the scrap foam, and the amount increases in recent years. Therefore it is of urgent necessity to develop a method for effectively reclaiming ever increasing scrap foam.

Much has been proposed about the technique of reclaiming rigid polyurethane foam scrap. For example, it is known to react foam scrap with glycol to recover polyol as a raw material. Further it is known to crush foam scrap to be used as filler, or to be used as reactive filler after treatment (to impart reactivity) with an amine in polyether polyol (Japanese Patent Publication No. 3689/1991).

The first reclaiming method mentioned above involves complex steps of foam decomposition, addition of epoxide, and purification. It gives rise to a colored liquid in low yields and the reclaim efficiency is very low because all except polyol is discarded.

Crushing (the second method) merely gives rise to a filler which degrades the resulting composite material due to the lack of reactive groups. The reactive filler obtained by the third method can prevent from a fall in product-properties, but is limited in its addition ratio, and another useful use of this filler is not referred.

So far, nothing has been known about how to utilize a liquid reclaimed from rigid polyurethane foam as an adhesive without further processing.

SUMMARY OF THE INVENTION

The present invention was completed to resolve the above-mentioned problem. It is an object of the present invention to provide a process for producing an epoxy adhesive auxiliary in the form of liquid reclaimed from rigid polyurethane foam. It is another object of the present invention to provide an epoxy adhesive produced from the epoxy adhesive auxiliary.

The present invention is embodied in a process for producing an epoxy adhesive auxiliary which comprises incorporating rigid polyurethane foam in powder form with glycol or amino alcohol or both, and heating them at 150°–280° C., thereby chemically decomposing the rigid polyurethane foam into a liquid to be reclaimed.

The present invention is also embodied in an epoxy adhesive which comprises the above-mentioned epoxy adhesive auxiliary (reclaimed liquid) and an epoxy resin adhesive base.

Containing a large number of urethane linkages in the rigid polyurethane foam, the foam gives rise to a reclaimed product having active terminal groups (such as hydroxyl group and amino group) upon decomposition by a difunctional compound such as glycol and amino alcohol. Since these active groups react with the epoxy resin adhesive base, the reclaimed product functions as a hardener. In addition, the reclaimed product is mainly composed of ligomers as suggested by it being a viscous liquid. Therefore, it has the hardening action and becomes an integral part of the epoxy adhesive after reaction.

According to the present invention, the reclaimed product is entirely used as a component (auxiliary) of the epoxy adhesive. Therefore, the process of the present invention permits 100% or nearly 100% reclaim of polyurethane foam.

As mentioned above, the present invention provides a process which reclaimes easily a liquid used as an epoxy adhesive auxiliary from rigid polyurethane foam without requiring any special purification. The liquid (the epoxy adhesive auxiliary) is a reclaimed product from rigid polyurethane foam and the reclaimed product is entirely used as one component of the useful epoxy adhesive. Therefore, the process of the present invention permits very high reclaim efficiency of the polyurethane foam.

Further, the present invention provides an epoxy adhesive which is superior in bond strength to the conventional epoxy adhesive containing a hardener. And only use of the reclaimed product give rise to hardening without a conventional hardener for epoxy resin adhesive.

DETAILED DESCRIPTION OF THE INVENTION

According to the present invention, there are no specific restrictions on the kind of the rigid polyurethane foam in powder form to be used as a raw material. It may be one which is based on toluene diisocyanate (TDI) or diphenylmethane diisocyanate (MDI). The reclaimed liquid varies in chemical composition (e.g., the content of amino group, hydroxyl group, and a kind of chemical compound (oligomer, mainly) having the group depending on the kind of the rigid polyurethane foam and the method of its decomposition. The powder of rigid polyurethane foam is desirable to be as fine as possible, with the particle diameter (maximum length) being about 3–10 mm.

The above-mentioned glycol includes polyalkylene glkycol such as polyethylene glycol and polypropylene glycol. The above-mentioned amino alcohol (amine compound having a hydroxyl group) includes primary amines such as 2-amino ethanol (monoethanolamine) and monopropanolamine. Further, secondary amines are less reactive in polyurethane decomposition. The amino alcohol has two active functional groups and converts the decomposition product of polyurethane into oligomers having terminal active groups (hydroxyl group or amino group).

According to the present invention, the above-mentioned glycol and amino alcohol may be used alone or in combination with each other. The glycol is desirable to be used in an amount of 20–100 parts (by weight) for 100 parts of polyurethane foam regardless of whether it is used alone or in combination with amino alcohol. With an amount less than 20 parts, it brings about the chemical decomposition slowly and gives rise to a reclaimed liquid with an excessively high viscosity. With an amount in excess of 100 parts, it gives rise to a reclaimed liquid which does not contain sufficient amino groups for epoxy curing. The amino alcohol is desirable to be used in an amount of 10–60 parts for 100 parts of polyurethane foam when it is used alone. With an amount less than 10 parts, it brings about the chemical decomposition slowly; with an amount in excess of 60 parts, it brings about the reaction too fast to not yield the desired and good product (as hardener). The amino alcohol is

Example 1

A 500 mililiter flask was charged with 100 g of diethylene glycol (hereinafter, referred to as DEG) and 5 g of 2-aminoethanol. They were heated with stirring at a prescribed temperature as shown in Table 1. Further, 200 g

TABLE 1

|  | Example 1 | | Example 2 | | Example 3 | Example 4 | |
| --- | --- | --- | --- | --- | --- | --- | --- |
| Designation of foam | A | | B | | C | D | |
| Designation of reclaim | A1 | A2 | B1 | B2 | C2 | D1 | D2 |
| Foam/DEG ratio (by weight) | 2.0 | 2.0 | 2.0 | 2.0 | 2.0 | 1.5 | 2.0 |
| Reaction temperature (°C.) | 190 | 230 | 200 | 230 | 230 | 160 | 230 |
| Reaction time (hour) | 11 | 2.0 | 11 | 2.0 | 2.5 | 6 | 1.5 |
| Total amine value (KOH mg/g) | 96.9 | 109 | 83.4 | 107 | 115 | 85.9 | 174 |
| Hydroxyl value (KOH mg/g) | 503 | 509 | 421 | 420 | 454 | 513 | 730 |
| Viscosity (Pa · s at 50° C.) | 13 | 6.97 | 140 | 111 | 23.5 | 84 | 10.5 | desirable to be used in an amount of 1–30 parts for 100 parts of the glycol when it is used in combination with the glycol. With an amount less than 1 parts, it brings about the chemical decomposition slowly and gives rise to a reclaimed liquid with an excessively high viscosity. With an amount in excess of 30 parts, it causes the reaction to proceed too far, resulting in production of deposit and phase separation.

According to the present invention, the reaction should be carried out at 150°–280° C., preferably 190°–240° C. At a reaction temperature below 150° C., the chemical decomposition does not proceed to give a viscous reclaimed liquid. At a reaction temperature above 280° C., there occurs thermal decomposition which evolves a large amount of gas, reducing a reclaim ratio and not giving rise to a product having stable adhesive properties.

The present invention is also embodied in an epoxy adhesive which comprises the above-mentioned epoxy adhesive auxiliary (reclaimed liquid) and an epoxy resin adhesive base. Further the epoxy adhesive may be incorporated with an any known hardener for epoxy adhesives, if necessary.

The above-mentioned epoxy resin adhesive base includes any known ones for epoxy adhesives, such as polyglycidyl ethers or the bisphenol type, polymer blend type, polyfunctional type, and novolak type etc. The above-mentioned hardener includes any known ones for epoxy adhesive, such as aliphatic amine: ethylene diamine, alicyclic amine: paramenthanediamine, aromatic amine: meta-phenylene diamine, acid anhydride: phthalic anhydride etc. The mixing ratio of the adhesive auxiliary (the reclaimed liquid) for 1 part of the epoxy resin adhesive base is desirable to be from 0.5 to 3.0 (preferably from 1.0 to 2.5). With a mixing ratio outside this range, the resulting epoxy adhesive is poor in bond strength. But when the reclaimed liquid is used together with another hardener, the mixing ratio may be less than 0.4.

DESCRIPTION OF THE PREFERRED EMBODIMENTS

The invention will be described in more detail with reference to the following examples.
(1) Production of reclaimed products and test of bond performance (Examples 1–4)

of crushed rigid polyurethane foam A (in the form of granule 30 kg/m$^3$, used for spray method, formed from polyether polyol (having a hydroxyl value of 510) and polymeric MDI)) was charged slowly in the flask with stirring at 200 rpm, reaction was carried out at a prescribed temperature for a prescribed period of time as shown in Table 1. The period of time was counted from a starting time of the charge. Thus there were obtained reclaimed products A1 and A2 in the form of viscous liquid, which have a total amine value, hydroxyl value, and viscosity as shown in Table 1. Futhermore, the viscosity was measured by Contraves Rheomat 115.

Example 2

The same procedure as in Example 1 was repeated except that the rigid polyurethane foam A was replaced by foam B (as an insulator for LNG) having a density of 40 kg/m$^3$ formed from polyether polyol (having a hydroxyl value of 457) and polymeric MDI and that the reaction temperature and reaction time were changed as shown in Table 1. Thus there were obtained reclaimed products B1 and B2 in the form of viscous liquid, which have a total amine value, hydroxyl value, and viscosity as shown in Table 1.

Example 3

The same procedure as in Example 1 was repeated except that the rigid polyurethane foam A was replaced by foam C (used for a molded panel operation method) having a density of 25 kg/m$^3$ formed from polyether polyol (having a hydroxyl value of 345) and polymeric MDI and that the reaction temperature and reaction time were changed as shown in Table 1. Thus there were obtained a reclaimed product C2 in the form of viscous liquid, which has a total amine value, hydroxyl value, and viscosity as shown in Table 1.

Example 4

The same procedure as in Example 1 was repeated by using 150 g of urethane-modified rigid isocyanurate foam D. 100 g of diethylene glycol, and 3 g of 2-aminoethanol at the prescribed temperature for the prescribed period of time as shown in Table 1. Thus there were obtained reclaimed products D1 and D2 in the form of viscous liquid, which have a total amine value, hydroxyl value, and viscosity as shown in Table 1.

The reclaimed products obtained in Examples 1 to 4 were made into epoxy adhesives (Nos. 1–16) by incorporating with an epoxy resin adhesive base and an optional hardener (diethylene triamine) as shown in Table 2. The base is a general-purpose bisphenol A-type epoxy resin, DER331J from Dow Chemical Co., Ltd. Nos. 15 and 16 denote comparative samples which do not contain the reclaimed product.

The epoxy adhesives (Nos. 1–16) as shown in Table 2 were mixed and coated on aluminum test pieces (A5052) with the surface polished and cleaned with acetone, and then the epoxy adhesives (Nos. 1, 2, 5, 6, 9, and 10) exhibit higher bond strength (1.7, 1.4, 1.7, 1.3, 1.7, and 1.5 times higher than the comparative sample No. 15) even though they are cured at room temperature.

The foregoing demonstrates that the reclaimed products obtained in Examples 1 to 4 contribute to superior bond strength, and the reclaimed products may use themselves as one component of epoxy adhesive, therefore reclaim efficiency is 100% and the reclaimed products may be utilized as general-purpose epoxy resin adhesive. Thus the method of the present invention is very effective in reclaiming rigid polyurethane foam.

In order to see the effect of the reaction temperature, the same procedure as in Example 1 was repeated except that the reaction was carried out at 140° C. and 290° C. It was found

TABLE 2

| Sample No. | Epoxy base (parts by weight) | Diethylene triamine (parts by weight) | Reclaim (parts by weight) | | | | Cure conditions | | Tensile shear bond strength (kg/cm$^2$) |
|---|---|---|---|---|---|---|---|---|---|
| | | | A1 | B1 | C1 | D1 | Temperature (°C.) | Time (hour) | |
| 1 | 100 | 7 | 100 | | | | Room temperature | 24 | 114.2 |
| 2 | 100 | 15 | 100 | | | | Room temperature | 24 | 92.04 |
| 3 | 100 | 15 | 100 | | | | 120 | 4 | 137.3 |
| 4 | 100 | | 100 | | | | 120 | 4 | 148.0 |
| 5 | 100 | 7 | | 100 | | | Room temperature | 24 | 111.4 |
| 6 | 100 | 15 | | 100 | | | Room temperature | 24 | 88.95 |
| 7 | 100 | 15 | | 100 | | | 120 | 4 | 114.4 |
| 8 | 100 | | | 200 | | | 120 | 4 | 107.9 |
| 9 | 100 | 7 | | | 100 | | Room temperature | 24 | 112.8 |
| 10 | 100 | 15 | | | 100 | | Room temperature | 24 | 103.7 |
| 11 | 100 | 15 | | | 100 | | 120 | 4 | 100.2 |
| 12 | 100 | | | | 200 | | 120 | 4 | 102.5 |
| 13 | 100 | 15 | | | | 100 | 120 | 4 | 141.8 |
| 14 | 100 | | | | | 200 | 120 | 4 | 99.71 |
| 15 | 100 | 15 | | | | | Room temperature | 24 | 65.80 |
| 16 | 100 | 15 | | | | | 120 | 4 | 82.58 | were cured under the conditions shown in Table 2. And bond strength was measured according to JIS K6850 as tensile shear bond strength and the results are shown in Table 2.

It is noted from Table 1 that the reclaimed product has a total amine value of 83–174 KOH mg/g, a hydroxyl value of 421–730 KOH mg/g, and a viscosity of 7–140 Pa.s (at 50° C.). The recovery ratio was nearly 100%. It is also noted that the reclaimed product tends to decrease in viscosity and increase in total amine value as the reaction temperature goes high (high temperature cases; A2, B2 AND D2, low temperature cases; A1, B1 and D1).

It is noted from Table 2 that the epoxy adhesives (Nos. 4, 8, 12, and 14) exhibit higher bond strength (1.8, 1.3, 1.2, and 1.2 times higher than the comparative sample No. 16) even though they do not contain diethylene triamine as a hardener. And the reclaimed products obtained in examples 1 to 4 have very superiorer bond strength than the comparative samples even though they change a sort of urethane form. Moreover, that reaction did not proceed smoothly at 140° C. and that vigorous reaction evolving a large amount of gas took place at 290° C. This result suggests that the desirable reaction temperature if 150°–280° C.

(2) Effect of addition of glycol

In order to see the effect of glycol on polyurethane foam A, experiments were carried out according to the procedure of Example 1, with the amount of DEG for 100 parts of foam A changed as shown in Table 3. The results are shown in Table 3.

It is noted that as the amount of DEG decreases, the reclaimed product increases in total amine value and viscosity and decreases in hydroxyl value. In the case of test Nos. 3-7 and 3-8, in which the amount of DEG is not more than 37 parts for 100 parts of foam A, the reclaimed products have sharply increased in viscosities. Conversely, in the case of test No. 3-1, in which the amount of DEG is

TABLE 3

| | Test No. | | | | | | | |
|---|---|---|---|---|---|---|---|---|
| | 3-1 | 3-2 | 3-3 | 3-4 | 3-5 | 3-6 | 3-7 | 3-8 |
| Foam A1/DEG ratio (by weight) | 0.5 | 1.0 | 1.5 | 1.7 | 2.0 | 2.2 | 2.7 | 3.0 |
| Amount of DEG (parts) for 100 Parts of foam A1 | 200 | 100 | 67 | 59 | 50 | 45 | 37 | 33 |
| Total amine value (KOH mg/g) | 63.9 | 77.2 | 96.3 | 106 | 113 | 119 | 124 | 141 |
| Hydroxyl value (KOH mg/g) | 752 | 671 | 623 | 594 | 571 | 550 | 517 | 510 |
| Viscosity (Pa · s at 40° C.) | 0.00 | 0.62 | 3.48 | 9.70 | 23.8 | 39.9 | 292 | 296 |

200 parts, the reclaimed product has a low total amine value, which leads to a low bond strength. In the case of test Nos. 3-2 to 3-6, in which the amount of DEG is 45 to 100 parts, the reclaimed products have a total amine value of 77–119 KOH mg/g, a hydroxyl value of 550–671 KOH mg/g, and a viscosity of 0.6–40 Pa.s (at 40° C.), which have a good balanced performance.

(3) Ratio of glycol and 2-aminoethanol

In order to see the effect of DEG used in combination with 2-aminoethanol, the same procedure as in Example 1 except reaction temperature and reaction time as shown in Table 4 was repeated and claimed products were produced. The results are shown in Table 4.

It is noted that as the ratio of DEG increases, the reclaimed product increases in viscosity but changes very little (or even decreases) in total amine value. On the other hand, as the ratio of 2-aminoethanol increases (as in No. 4-5 in which the amount of 2-aminoethanol is not more than 10 parts for 100 parts of DEG), the reclaimed product slightly increases in total amine value. In the case of No. 4-6 in which 2-aminoethanol is used alone, the reclaimed product greatly increases in total amine value but decreases in viscosity. In the case of Nos. 4-3 to 4-5 in which the amount of 2-aminoethanol is 5–10 parts for 100 parts of DEG, the reclaimed products have a total amine value of 92–97 KOH mg/g, a hydroxyl value of 509–553 KOH mg/g, and a

TABLE 4

|  | Test No. | | | | | |
| --- | --- | --- | --- | --- | --- | --- |
|  | 4-1 | 4-2 | 4-3 | 4-4 | 4-5 | 4-6 |
| 2-amino ethanol/DPG ratio (parts/parts) | 0/100 | 3/100 | 5/100 | 7/100 | 10/100 | 100/0 |
| Reaction temperature (°C.) | 190 | 190 | 190 | 190 | 190 | 165 |
| Reaction time (hour) | 16 | 13 | 11 | 9 | 6 | 4 |
| Total amine value (KOH mg/g) | 88.37 | 89.65 | 92.00 | 96.53 | 97.19 | 274.5 |
| Hydroxyl value (KOH mg/g) | 515.7 | 514.8 | 508.7 | 532.1 | 552.6 | — |
| Viscosity (Pa · s at 35° C.) | 220 | 185 | 154 | 126 | 59.3 | — | viscosity of 59–154 Pa.s (at 35° C.), which have a good balanced performance.

It is also noted that the decomposition reaction takes place more slowly in the case where glycol is used alone than in the case where amino alcohol is used alone. This is shown by Test Nos. 4-1 and 4-6 in Table 4. In the case of No. 4-1 in which glycol was used alone and the reaction was carried at 190° C. for 16 hours, the reclaimed product was highly viscous (which indicates incomplete decomposition). On the other hand, in the case of No. 4-6 in which amino alcohol was used alone and the reaction was carried out at 165° C. for 4 hours, the reclaimed product was less viscous and had a high total amine value. But some crystalline matter was formed on cooling to room temperature.

The foregoing demonstrates that the reclaimed product can be obtained as desired if proper conditions are selected and the reaction can be easily controlled if glycol and amino alcohol are used in combination with each other.

(4) Ratio of reclaimed product and epoxy adhesive base

In order to see the effect of the mixing ratio of the reclaimed product and the epoxy resin adhesive base, experiments were carried out in which adhesives were prepared in different mixing ratios as shown in Table 5. The resulting adhesives were tested for bond performance in the same manner as in Example 1. The results are shown in

TABLE 5

|  | Test No. | | | | | |
| --- | --- | --- | --- | --- | --- | --- |
|  | 5-1 | 5-2 | 5-3 | 5-4 | 5-5 | 5-6 |
| reclaim A1/ Epoxy adhesive base ratio (by weight) | 0.5 | 1.0 | 1.5 | 2.0 | 2.5 | 3.0 |
| Amount (by weight) of epoxy adhesive base for 1 part of reclaim A1 | 2.0 | 1.0 | 0.67 | 0.50 | 0.40 | 0.33 |
| Bond strength (kg/cm²) | 61.65 | 143.9 | 141.9 | 138.0 | 104.2 | 80.75 |

Table 5. In the experiments, the epoxy resin adhesive base is the same one as used in Example 1 and the reclaimed product is the one designated as A1 which was obtained in Example 1. Futhermore the ratio of the reclaimed product A1 for 1 part of the epoxy resin adhesive base were shown in Table 5.

It is noted that when the amount of the reclaimed product (A1) is 1.0–2.5 part for 1 part of the epoxy resin adhesive base (as in Nos. 5-2 to 5-5), the resulting adhesives exhibited high bond strength. And the resulting adhesives are poor in bond strength when the amount is outside this range.

(5) Effect of addition of coupling agent

In order to see the effect of coupling agent, experiments were carried out in which the adhesive prepared in Example 1 was incorporated with a coupling agent in different amount as shown in Table 6. The resulting adhesive was tested for tensile shear bond strength in the same manner as Example 1. The results are shown in Table 6. In the experiments, the epoxy resin adhesive base and the reclaimed product are the same one as used in Example 1. And the coupling agent is a silicone system coupling agent (product name; "SH6040", produced by TORAY DOW CORNING Co. LTD.).

It is noted that the adhesive increases in bond strength with increasing amount of coupling agent and the

TABLE 6

|  | Test No. | | | | |
| --- | --- | --- | --- | --- | --- |
|  | 6-1 | 6-2 | 6-3 | 6-4 | 6-5 |
| Coupling agent/ (epoxy adhesive base + reclaim A1) (wt %) | 0 | 1 | 3 | 4 | 5 |
| Tensile strength (kg/cm²) | 139.9 | 153.2 | 165.0 | 170.7 | 173.0 | bond strength increased 10–24% over control No. 6-1 when the amount of coupling agent is 1–5wt %.

While preferred embodiments have been described, variations thereto will occur to those skilled in the art within the scope of the present inventive concepts. For example, the adhesive may be incorporated with coupling agent, filler, antiseptic, antifoamer, antioxidant, hardening accelerator, etc. if necessary. As the coupling agent, a wellknown ones used commonly for an epoxy resin adhesive may be used. Examples of the coupling agent include β-(3,4-epoxy)

cyclohexylethyltrimethoxysilane and γ- chloro-propyltrimethoxysilane. As the filler, $CaCO_3$, $Al_2O_3$, china clay, $BaSO_4$, mica, silica and talc etc. may be used.

What is claimed is:

1. A process of producing an epoxy adhesive which comprises (a) mixing rigid polyurethane foam in powder form with glycol and amino alcohol, and heating the resulting mixture at 150°–280° C., said glycol and said amino alcohol and the amounts thereof, being effective in the resulting heated mixture to chemically decompose said rigid polyurethane foam into a reclaimed liquid having a total amine value of 30–180 KOH mg/g, and a hydroxyl value of 400–750 KOH mg/g, and (b) mixing said reclaimed liquid with a polyglycidyl ether of an epoxy resin adhesive in an amount of 0.5–3.0 parts for 1 part of said epoxy resin adhesive, wherein said epoxy resin adhesive is a bisphenol or novolak epoxy adhesive.

2. The process as defined in claim 1, wherein the glycol is a polyalkylene glycol and the amino alcohol is a primary amine.

3. The process defined in claim 1, wherein said glycol is diethylene glycol or polypropylene glycol and said amino alcohol is 2-amino ethanol.

4. The process defined in claim 1 wherein said glycol is added in an amount of 45–100 parts for 100 parts, by weight, of said rigid polyurethane foam and said amino alcohol is used in an amount of 1–10 parts for 100 parts, by weight, of said glycol.

5. The process as defined in claim 1, wherein the polyurethane powder has a particle diameter of about 3–10 mm.

6. The process of producing an epoxy adhesive which comprises (a) mixing rigid polyurethane foam in powder form and having a particle diameter not greater than about 10 mm with 20–100 parts by weight of diethylene glycol per 100 parts by weight of the polyurethane foam and 1–30 parts by weight of 2-aminoethanol per 100 parts by weight of said diethylene glycol, and heating the resulting mixture at 150°–280° C. to chemically decompose said rigid polyurethane foam into a reclaimed liquid, and (b) mixing said reclaimed liquid with a bisphenol A epoxy resin adhesive in an amount of 0.5–3.0 parts per 1 part, by weight, of said epoxy resin adhesive base.

7. A process of producing an epoxy adhesive which comprises (a) mixing rigid polyurethane foam in powder form and having a particle diameter not greater than about 10 mm with 45–100 parts by weight of diethylene glycol per 100 parts by weight of the polyurethane foam and 1–10 parts by weight of 2-aminoethanol per 100 parts by weight of said diethylene glycol, and heating the resulting mixture at 150°–280° C. to chemically decompose said rigid polyurethane foam into a reclaimed liquid having a total amino value of 30–180 KOH mg/g. a hydroxyl value of 400–700 KOH mg/g, and mixing said reclaimed liquid with a bisphenol A epoxy resin adhesive in an amount of 0.5 to 3.0 parts per 1 part, by weight, of said epoxy resin adhesive base.

* * * * *